Oct. 15, 1963 K. HILDEBRAND 3,107,270
TELESCOPE WITH CIRCULAR INTERFERENCE GRATING RETICLE
Filed July 21, 1959 3 Sheets-Sheet 1
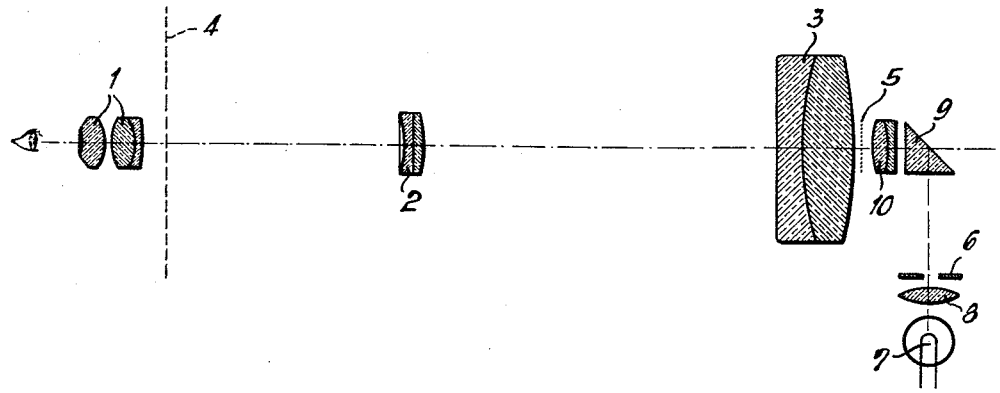
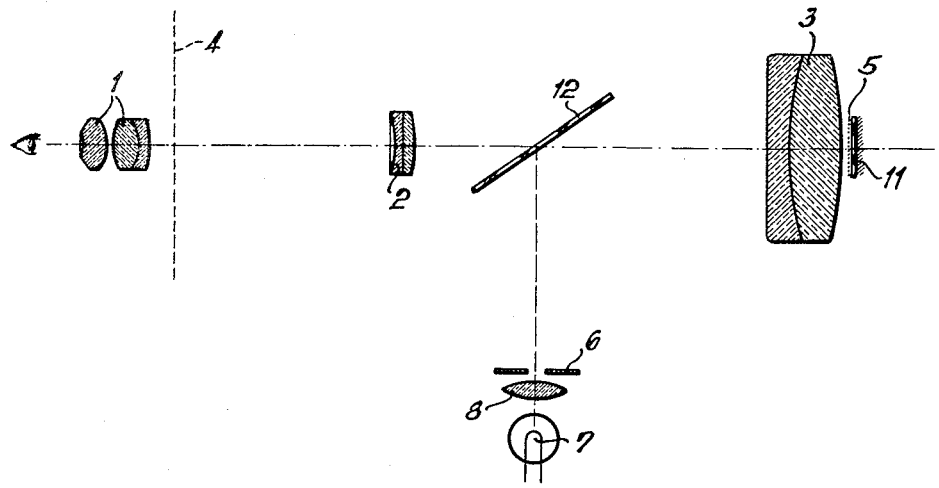
INVENTOR
Klaus Hildebrand
BY: Samuel W. Kipnis
Atty.

Oct. 15, 1963    K. HILDEBRAND    3,107,270
TELESCOPE WITH CIRCULAR INTERFERENCE GRATING RETICLE
Filed July 21, 1959    3 Sheets-Sheet 2

INVENTOR
Klaus Hildebrand

By Samuel W. Kipnis
Atty.

United States Patent Office 3,107,270
Patented Oct. 15, 1963

3,107,270
TELESCOPE WITH CIRCULAR INTERFERENCE GRATING RETICLE
Klaus Hildebrand, Berlin-Neukoelln, Germany, assignor to Askania-Werke A.G., Berlin-Friedenau, Germany, a corporation of Germany
Filed July 21, 1959, Ser. No. 828,489
Claims priority, application Germany July 31, 1958
3 Claims. (Cl. 88—32)

This invention relates to telescopes for observation of targets which have widely varying distances from the observer (wide range telescopes or alignment telescopes). High precision focussing is required for such telescopes; not only because it is generally necessary to shift a focussing lens along the telescope axis in order to produce images of objects of different range or distance, but also because of problems of the required cross hairs or focussing reticles, the positioning of which is affected by the shifting of the focussing lens.

Heretofore, such reticles were provided with shifting mechanisms of their own, which however introduced focussing errors of their own. Although the linear, transverse displacement, caused by appreciable axial shifting of any one element in a high precision telescope can be kept small, for instance at a few microns, a displacement of such type nevertheless causes lateral displacement of the focussing line, sufficient to introduce an error of a few seconds of arc in the orientation of the telescope. Yet it is a principal concern of the users of such telescopes that such erroneous orientation be avoided and the focussing line kept stable. Hitherto this was to be achieved only to a limited extent, and that only by precision mechanics of very substantial complexity and cost.

The invention provides a fundamentally different way of achieving the object of keeping the focussing line stable. It eliminates the necessity of shiftable reticles or equivalent structures, by providing instead, or in addition thereto, optical means for producing in the imaging ray trace of the telescope a marker image of substantial depth, this image being produced by means which at least include the focussing lens.

The deep-range marker image can be produced by a variety of optical means, including for instance a system which utilizes an interference phenomenon, as will be described.

Figure 3:
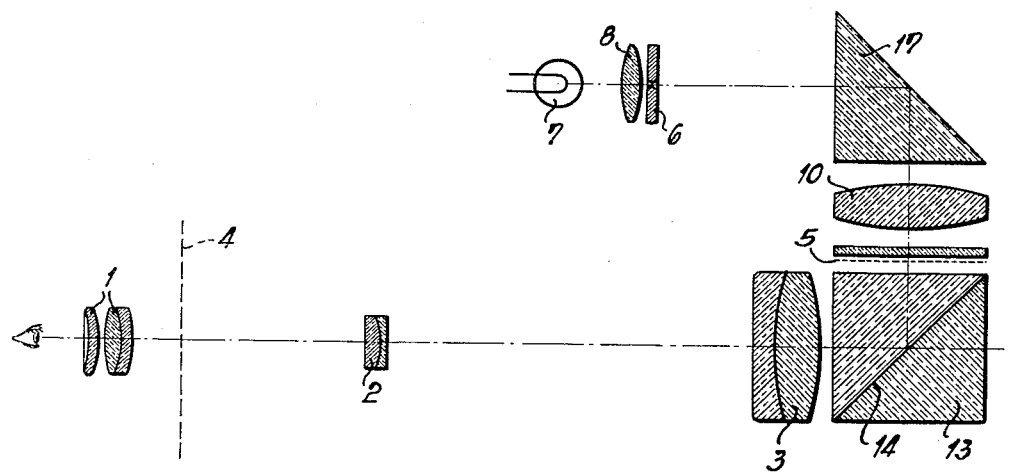
Figure 5:
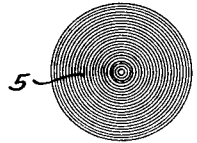
Figure 4:
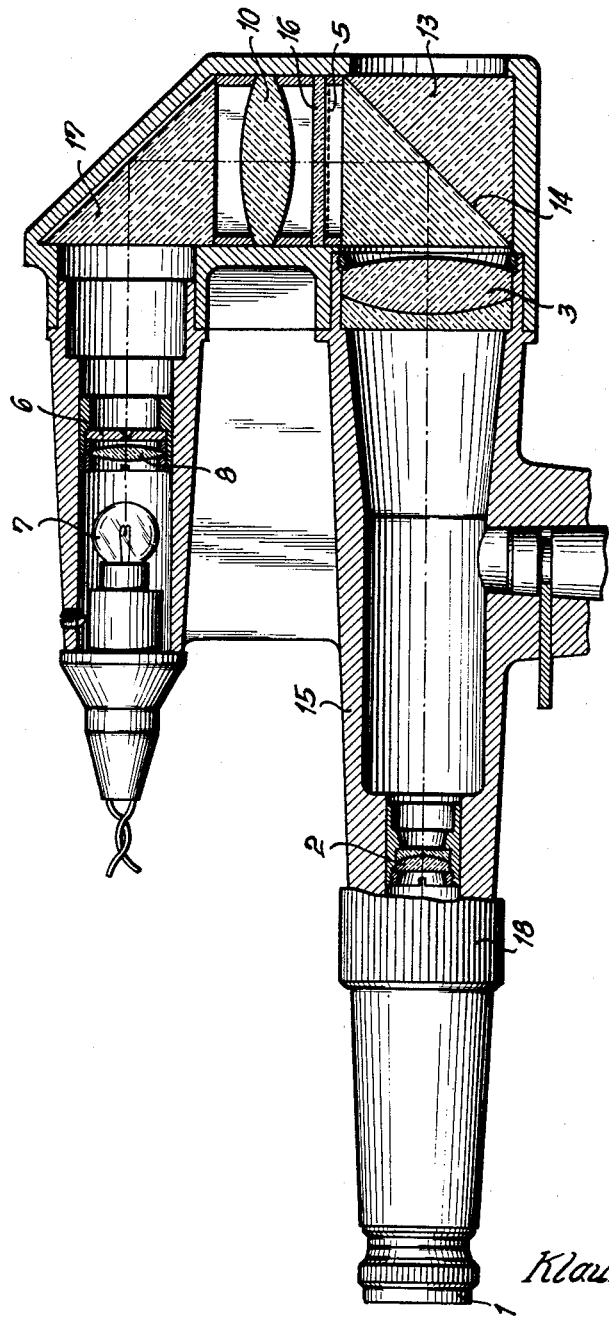

In the drawing, FIGURE 1 is a schematic, longitudinal section through a first embodiment of the invention; FIGURE 2 is a similar section through a second embodiment; FIGURE 3 is a similar section through a third embodiment; and FIGURE 4 is a less schematic section through the actual telescope, embodying the arrangement of FIGURE 3. FIGURE 5 is a plan or front view of an element of FIGURES 3 and 4 and FIGURE 6 is a similar view, showing the image of said element, visible in the telescope.

In each of FIGURES 1 to 4, the focussing lens 2 is shiftable between objective lens 3 and ocular lens 1, in order that objects (not shown), disposed at various distances or ranges to the right of objective 3, can be imaged sharply in an image plane 4 between the ocular and the focussing lens. The position of plane 4 depends on the shifting of lens 2. Heretofore, as mentioned, reticles or the like were provided, to be placed in—that is, shifted into—the proper image plane 4. No such reticle is used according to the invention. Instead, FIGURE 1 shows in front of a central portion of the objective lens, a grating 5, illuminated through point aperture 6 by light source 7, with the aid of collector lens 8, these elements 6, 7 and 8 being disposed laterally of the telescope axis and the illuminating light being directed to the grating by a small prism 9, through a lens 10 which collimates the light from point aperture 6.

Grating 5, as shown in FIGURE 5, constitutes a system of concentric circles of uniform width and which are alternately opaque and transparent and desirably of narrow width. The illumination should be substantially coherent; it is for this reason that aperture 6 must be pointlike; and the light from source 7 is desirably more or less monochromatic.

Figure 6:
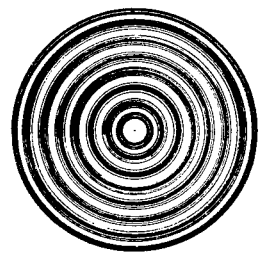

As a result of these arrangements there is formed a grating image 5', a front view of which appears in FIGURE 6, and which in FIGURE 1 would be seen from the side, and centered on plane 4, relative to which it has substantial depth, that is, extension from right to left. The object image, not shown in FIGURE 6, is superimposed on this grating image, so that the latter can be used like a reticle, for precisely adjusting the orientation of the telescope. The grating image has, however, definite advantages over the usual reticle. In the first place it requires no shifting; it is automatically formed in image plane 4, wherever that plane may come to lie due to the shifting of the focussing lens 2. Thus an operation hitherto employed becomes unnecessary. Additionally, and importantly, the new arrangement eliminates the problem of reconciliation of lateral misalignments, since the grating image 5', in plane 4, automatically shares any and all lateral displacements which the focussing lens may suffer incident to its axial shift. Thus, in fact, it is allowable to operate with relatively simple means for the guidance of the shifting lens.

It is believed to be unnecessary to describe the interference phenomenon involved in the imaging of a grating, and particularly in the imaging of circular grating 5, the underlying laws and principles being well known to the art. It may be noted, however, that a great variety of modifications are available for obtaining results similar to those thus far described.

For instance, according to FIGURE 2 the grating image can be formed in an autocollimating way. Grating 5 in this case has plane mirror 11 disposed in back thereof. While in FIGURE 1 the lateral system 6, 7, 8 was disposed on an axis which intersected the telescope axis in front of (beyond) the objective, a similar system 6, 7, 8 is here disposed on an axis which intersects the telescope axis between objective 3 and focussing lens 2; and at the point of intersection a semireflector 12 is obliquely arranged.

According to the further modification of FIGURES 3 and 4, grating 5 as well as elements 6, 7, 8 is disposed laterally of the telescope axis and is suitably formed on a glass plate as shown. A prismatic glass body 13 with an oblique interface 14 having a semireflecting coating thereon serves to bring light from source 7, as well as light from the object, into the telescope 15. The grating plate is shown at 16. In order to conserve space, system 6, 7, 8 is connected with this plate via prism 17. The mechanism for shifting the focussing lens 2 is schematically shown at 18. It will be seen that, although it is mechanically impossible to keep the focussing lens 2 exactly upon the telescope axis passing through the centers of objective 3 and ocular 1, the initially described misorientations are fully avoided, it being unnecessary to rely on any added shifting mechanism for a physically solid reticle, or to reconcile misorientations of shifting mechanisms.

An added advantage of the described arrangement is that it also automatically compensates for misorientations caused by thermal uncentering of objective 3, and for other similar misorientations—the orienting means always synchronously moves relative to the axis. The criticality and cost of a number of telescope parts, not only that of the play between tube 15 and the holder of lens 2, is reduced by these features.

In some cases the grating image 5' may have insufficient brilliance, relative to the object image, to make focussing by the image 5' convenient. In such cases it may be desired to re-introduce a physically solid reticle or crosshair system, not shown. It will be evident that this system can then be manually adjusted to coincide with the center of the grating image, while the brilliant object image is temporarily withheld by a suitable shutter or similar mechanism, not shown. The operation is still vastly simpler and better and the construction is still much more economical than in prior instruments of equivalent precision.

It is also possible, as already mentioned, to form the focussing marker image in ways different from the interference process. It is for instance possible to replace grating 5, in FIGURES 1, 2 or 3, by an object or obturator, desirably of circular section, which may be luminous or suitably illuminated, and an image of which is formed, substantially in plane 4, by a lens of circular section and of extremely large geometric aberration, for instance by a conical system of the type known as axicon, such obturator and axicon taking the place of elements 10, 16. As a still further submodification, the geometrical aberration of such a system can be replaced by chromatic aberration, for which purpose it may be desirable to adapt light source 7, by well-known means not shown, to produce light of different colors. Each of these arrangements is able to produce a marker image of great depth, as will readily be understood by persons skilled in the art, and which in accordance with this invention can be used for improved focussing in the wide-range or deep-range telescope.

I claim:

1. A wide range telescope comprising objective means, ocular means, a focussing lens therebetween, means to move the focussing lens to form an image plane varying in longitudinal position with the position of the focussing lens and the object sighted, and means for forming a marker image between the ocular means and the focussing lens, the marker image-forming means being wholly mounted on the telescope and forming said image through the focussing lens, said means for forming the marker image comprising a source of substantially coherent light laterally displaced from the optical path of the telescope, an optical element on the axis of the telescope forward of the objective forming a reflective optical path from the source extending to the objective but leaving an optical path from an object being viewed to the objective, a collimating lens and a circular interference grating in said path between the source and the objective forming an interference pattern consisting of concentric circles projected along the optical axis through the objective along with a viewed field, so that any lateral displacement of the focussing lens results in corresponding lateral displacement of both the marker image and a viewed image, and the concentric marker image remains visible in the eyepiece over a substantial focussing range.

2. A telescope as described in claim 1 wherein the grating is disposed on the axis of the telescope between said optical element and the objective and both said optical element and the grating occupy substantially less than the entire field of view of the telescope.

3. A telescope as described in claim 1 wherein the grating is disposed on an axis intersecting the axis of the telescope between the light source and said optical element, the optical element being a semi-transparent mirror.

References Cited in the file of this patent

UNITED STATES PATENTS

| | | |
|---|---|---|
| 1,889,151 | Pechan et al. | Nov. 29, 1932 |
| 2,456,728 | Ohman | Dec. 21, 1948 |
| 2,463,280 | Kaehni et al. | Mar. 1, 1949 |
| 2,577,807 | Pryor | Dec. 11, 1951 |
| 2,759,393 | McLeod | Aug. 21, 1956 |
| 2,807,981 | Barnes | Oct. 1, 1957 |

FOREIGN PATENTS

| | | |
|---|---|---|
| 431,371 | Great Britain | July 5, 1935 |